July 15, 1969　　　C. C. HORSTMAN　　　3,456,224

TRANSFORMER WITH A LAMINATED CORE

Original Filed Oct. 23, 1964

WITNESSES:
John L. Chopp
James F. Young

INVENTOR
Clifford C. Horstman
BY
Donald R. Lackey
ATTORNEY 3,456,224
TRANSFORMER WITH A LAMINATED CORE
Clifford C. Horstman, Sharpsville, Pa., assignor to Westinghouse Electric Corporation, Pittsburgh, Pa., a corporation of Pennsylvania
Continuation of application Ser. No. 406,123, Oct. 23, 1964. This application June 1, 1966, Ser. No. 562,027
Int. Cl. H01f 27/24
U.S. Cl. 336—211  6 Claims

ABSTRACT OF THE DISCLOSURE

Electrical inductive apparatus having a magnetic core-winding assembly encapsulated in solid electrical insulating means. The magnetic core has a plurality of metallic laminations which are bonded together and electrically insulated by an inorganic vitreous material disposed between the laminations.

---

This application is a continuation of application Ser. No. 406,123, filed Oct. 23, 1964, now abandoned, which is assigned to the same assignee as the present application.

This invention relates in general to electrical inductive apparatus, and more particularly to electrical inductive apparatus having a magnetic core bonded by an inorganic vitreous material, and solid insulation comprising a mixture of certain resins and inorganic fillers.

Certain types of dry type, inductive apparatus, such as transformers, utilize solid insulation which completely capsulates the magnetic core and winding assembly. A typical process for manufacturing such apparatus includes forming a magnetic core of the desired shape from magnetic strip material, which has a coating thereon, such as magnesium phosphate, to electrically insulate adjacent laminations. After forming, the magnetic core is annealed to remove any stresses imparted to the core during the winding operation. Next, the magnetic core is impregnated with an organic binder and subjected to a heating cycle to cure the binder and bond the core into a coherent mass or unit. The magnetic core may then be cut without delamination to allow assembly about a preformed winding structure. After cutting, the magnetic core is stress relieved in a heating cycle which stabilizes the dimensions of the core. The magnetic core is then assembled about a winding structure, and the assembly placed in a casing or container. Insulation, in liquid form is poured into the casing, along with a suitable filler, to completely surround and capsulate the assembly, and the insulation is cured to form a solid mass. The capsulating of the core and windings provides excellent mechanical protection for the core and windings, as well as electrically insulating the assembly and making it impervious to moisture and corrosion.

This construction, however, possesses some important disadvantages. The shrinkage of the capsulating material upon curing from a liquid to a solid state exerts pressure upon the magnetic core, causing strains to be introduced into the core which increases its losses and also increases the exciting current required by the core. Further, it would be desirable to reduce the number of manufacturing steps required to assemble the transformer. Still further, it would be desirable to reduce the sound or noise level of the completed transformer assembly, and to increase the maximum temperature at which the transformer may safely operate.

Accordingly, it is an object of the invention to provide new and improved electrical inductive apparatus.

Another object of the invention is to provide new and improved inductive apparatus in which the magnetic core and winding assembly are capsulated in solid insulation without substantially increasing the core loss of the transformer.

A further object of the invention is to provide new and improved inductive apparatus in which the magnetic core and winding assembly are capsulated in solid insulation without substantially increasing the exciting volt-amperes required by the magnetic core.

Still another object of the invention is to provide new and improved capsulated inductive apparatus which requires fewer manufacturing steps to construct.

A further object of the invention is to provide new and improved capsulated inductive apparatus which will operate without adverse affects at elevated temperatures.

Another object of the invention is to provide new and improved capsulated inductive apparatus which will produce a lower sound level than transformers constructed in the conventional manner.

Briefly, the present invention accomplishes the above cited objects by constructing the magnetic core used in the transformer from magnetic strip which has a coating of inorganic, vitreous, glass-like material fused thereon. For example, a magnetic core constructed according to the teachings of co-pending application Ser. No. 278,944, filed May 8, 1963, and assigned to the same assignee as the present application would be suitable. The flow or softening temperature of the vitreous material or glass is selected to substantially correspond with the annealing temperature of the magnetic strip. When the magnetic core is annealed after winding to remove the stresses introduced during the forming of the magnetic core, the vitreous material softens, and upon cooling of the core, bonds the core structure into a coherent solid. The resulting magnetic core is absolutely stable, eliminating the necessity of a stress relief operation after cutting. Further, the core is not affected by the capsulating stresses set up when fluid insulating material is disposed to surround the core-winding assembly, and cured to a solid mass. The core losses and exciting volt-amperes are substantially the same after capsulation or potting as they were prior to the capsulating operation. The high softening or flow temperature of the vitreous material enables transformers constructed with such a magnetic core to be operated at a temperature of 500° C., or higher, without causing delamination of the core. Further, the coefficient of expansion of the vitreous material is deliberately selected to be lower than the coefficient of expansion of the magnetic strip, thus putting the vitreous material or glass in compression, and the magnetic strip slightly in tension. This reduces the sound level of the apparatus due to magnetostriction.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figure 1:
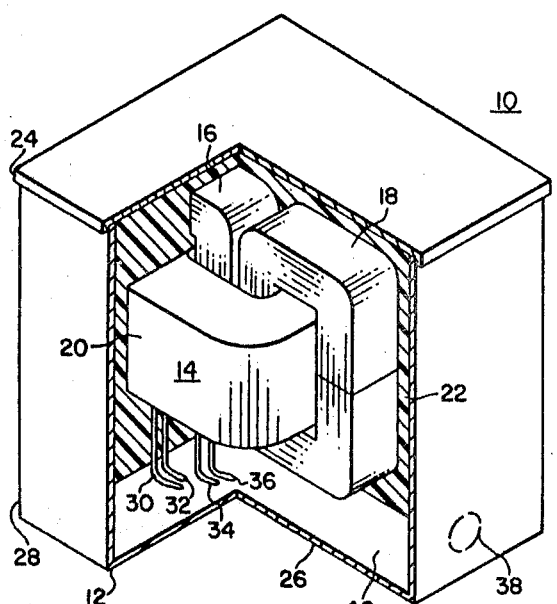
FIGURE 1 is a perspective view of a transformer, partially cut away, showing a transformer construction which may utilize the teachings of this invention.

Referring now to the drawings, and FIG. 1 in particular, there is illustrated an electrical transformer 10, having a construction which may utilize the teachings of this invention. The transformer 10 has a magnetic core and winding assembly 14 disposed within a metallic casing 12. The magnetic core and winding assembly includes magnetic cores 16 and 18 having a winding 20, which represents the primary and secondary windings of the transformer, disposed thereon. The space between the magnetic core and winding assembly 14 and the casing 12 is filled with a solid insulation 22.

More specifically, the casing 12 includes a top section 24, a bottom section 26 and side wall portions 28. The top section 24 may be secured to the side wall portions by any suitable means, such as by welding, and the bottom section may be secured to the casing in a manner which allows removal, such as by screws, to allow access to the space 40 between the insulation 22 and bottom section 26, for making connections to electrical leads 30, 32, 34 and 36 from winding 20. Knockouts 38 may be provided in the casing 12 to allow electrical conductors to enter the lead compartment 40. Suitable terminal blocks (not shown) may be provided in the lead compartment, if desired, to facilitate connection of the leads 30, 32, 34 and 36 to external electrical conductors.

The magnetic cores 16 and 18 may be wound of magnetic strip material to form a plurality of nested laminations, which may then be cut to form matching C-core sections, held in assembled relation with banding straps (not shown); or any other type of core may be utilized, such as the stacked laminated types. The usual method of constructing wound C-cores is to coat a strip of magnetic material with an electrical insulating material, such as magnesium phosphate, slit the strip to width, and wind the strip on a suitable mandrel to obtain the desired buildup of superimposed laminations disposed around a window or opening. Depending upon the particular application in which the magnetic cores are to be utilized, the magnetic strip will usually be 12, 4, 2 or 1 mil thick. After winding, the wound magnetic strip material is annealed to remove any stresses imparted to the core during the winding operation, with the annealing temperature depending upon the composition of the magnetic strip and its thickness. Silicon-iron magnetic strip is usually annealed at a temperature between 720 and 825° C., with the thinner magnetic strip being annealed at the lower temperatures to prevent excessive secondary grain growth. The annealing cycle involves 6 to 8 hours to bring the magnetic cores up to the desired annealing temperature, three hours soak at the annealing temperature, and 6 to 8 hours for cooling the cores. After the annealing cycle, any adhesions between adjacent laminations are broken, and the cores are subjected to a vacuum impregnation operation which introduces an organic bonding material, such as an epoxy resin, between the laminations of the core. Upon curing of the bonding resin, which requires approximately five hours at 180° C. in a suitable oven, the cores are bonded into a solid assembly which allows them to be cut without delamination. After the cutting of the cores, which allows the cores to be easily placed around pre-formed coils or windings, the magnetic cores are again heated in an oven at a temperature of 150° C. for three hours, to relieve stresses and stabilize the dimensions of the cores. The cut faces of the magnetic cores are then ground and etched to remove burrs, and the cores are trimmed to size by removing the necessary number of inner and outer laminations. The core faces may be lapped after grinding, if desired.

This method of producing wound magnetic cores, however, has some important disadvantages when the magnetic core and winding assembly is to be encapsulated in solid insulation, such as shown in FIG. 1. The insulation 22, which will be described in greater detail hereinafter, is poured into the casing 12 in a liquid state, to surround the magnetic core and winding assembly 14, and is then cured at an elevated temperature to form a solid mass. Upon curing, the insulation 22 exerts stresses upon the magnetic cores 16 and 18, which greatly increases the core loss of the cores and the exciting volt-amperes required by the cores. By constructing the magnetic cores according to this invention, they are made practically immune to capsulating stresses, with the core losses and exciting volt-amperes being substantially the same after capsulation as they were before capsulation, and at the same time additional benefits are provided, such as reducing the sound level of the electrical apparatus, the ability of the magnetic cores to withstand higher operating temperatures, and the elimination of certain steps in the manufacture of the transformers.

More specifically, instead of applying an electrical insulation to the strip, and subsequently an organic binder to bond the superimposed laminations into a coherent magnetic core, the magnetic strip is coated with an inorganic, vitreous, glass-like material which is then fused to the strip. The fused glass forms the desired electrical insulation on the strip. Then, when the magnetic cores are annealed after being wound to shape, to remove winding stresses, the glass material softens and, upon cooling, solidifies to bond the core into an absolutely stable, coherent structure. The magnetic core is so stable, that the subsequent heat treatment given organically bonded cores to stabilize dimensions is not required. Also, the vacuum impregnation and subsequent bake or heat treatment of the organic bonding material is eliminated, as the glass material is tailored to soften at the annealing temperature of the strip. The magnetic cores are thus annealed and bonded in the same heating operation.

A suitable process for constructing glass bonded cores involves cleaning and etching the magnetic strip to remove all traces of grease and oxides. The magnetic strip is then plated to apply a very thin coating or flash of metallic material selected to prevent iron oxide growth and other contaminants in the glass which would cause the glass bond to deteriorate. Nickel or aluminum has been found to be a satisfactory barrier when silicon-iron strip is being coated. After this treatment of the magnetic strip, a thin coating of vitreous particles in a suitable vehicle, such as isopropyl alcohol, may be applied to the strip by dipping, rolling or spraying. The coating is then dried to an adherent powder and the strip is then passed through a furnace to fuse the coating into a thin continuous bubble free layer. The glass particles are heated to a fluid condition, with the viscosity of the glass being approximately 5000 poises.

The glass composition selected for a particular application is determined primarily by the annealing temperature required by the magnetic strip material being coated. Glasses in which at least one of the oxides of silicon, boron and phosphorus are the glass-formers may be used when the annealing and operation temperature of the magnetic core allow. Any number of combinations of glass forming material will produce satisfactory results. It is important to select a glass composition which has a viscosity at the annealing temperature of the magnetic strip sufficient to adhere to the strip without running.

The following glass compositions have been found to be extremely satisfactory for the silicon-iron magnetic materials.

TABLE I.—GLASS COATING COMPOSITIONS, WT. PERCENT

| | Range | Specific Composition |
|---|---|---|
| $SiO_2$ | 36.00 to 54.65 | 41.92 |
| $B_2O_3$ | 5.05 to 18.00 | 11.70 |
| $Al_2O_3$ | 2.00 to 7.35 | 4.88 |
| $Na_2O$ | 3.65 to 18.00 | 17.55 |
| $K_2O$ | 7.00 to 30.45 | 6.82 |
| $CaO$ | 0.00 to 10.00 | |
| $CaF_2$ | 0.00 to 5.00 | 4.88 |
| $BaO$ | 0.00 to 20.90 | 9.75 |
| $ZnO$ | 0.00 to 4.05 | |
| $ZrO_2$ | 0.00 to 1.35 | |
| $MnO_2$ | 0.50 to 1.00 | 0.50 |
| $NiO$ | 0.50 to 1.00 | 0.50 |
| $CoO$ | 0.50 to 1.50 | 1.50 |

In this formulation, boron oxide may be reduced to 2%, or less. Sodium oxide may replace the potassium oxide. Manganese, nickel and cobalt oxides may be left out.

In making the vitreous coating, the glass may be wet ground to obtain an average particle size of approximately 1.5 microns. A deflocculating agent, such as trihexylene glycol biborate may be used to maintain the vitreous particles in suspension. The thickness of the fused vitreous coating may range from 0.1 mil to 1 mil, or more. After fusing the coating in a furnace having a temperature of 850° C. to 950° C., the strip is still extremely flexible, allowing it to be wound into a magnetic core without affecting the adhesion of the glass to the strip. Conventional magnetic core winding apparatus may be used.

After the coated magnetic strip is wound to form a magnetic core of the desired size and shape, the formed core is placed in a furnace and annealed similar to the annealing process hereinbefore described for organically bonded cores. In this annealing operation, however, not only are the winding stresses in the magnetic core relieved, but the magnetic core is bonded in the same operation. The glass coating on the magnetic strip is selected such that it softens to a plastic condition having a viscosity of approximately $10^7$ poises.

The annealing temperature, which depends upon the strip material and its thickness, is usually between 720° C. and 825° C. for silicon-iron material. After the annealing and bonding operation, the magnetic core may be cut with conventional cutting equipment, without delamination. The magnetic core is so dimensionally stable, that the heat treating cycle normally applied to originally bonded cores at this stage is not required. The cut cores may then be treated exactly like organically bonded cores, with the cut faces being ground, lapped if desired, and etched to remove burrs. The cores are then trimmed to size.

The windings 20, which include primary and secondary windings, are formed of an electrically conductive material, such as aluminum or copper. The conductive material may be in the form of conductive foil, strip or wire. The windings 20 have electrical leads 30, 32, 34 and 36 extending therefrom, to allow electrical connections to be made to the primary and secondary windings.

The insulation 22, which capsulates the magnetic core and winding assembly 14, may, in general, be formulated from solventless, thermosetting resins, such as the epoxy, polyester or the silicone type, and include certain finely divided, inorganic, non-friable, inert fillers. Plasticizers may be added to the resins to make the insulation more elastic. The insulating material 22 is converted to a thermosetting state and forms a solid, impervious mass, to capsulate the magnetic core-winding assembly 14, and tightly adhere thereto. The insulation 22 also adheres or bonds to the casing 12, thus supporting the magnetic core and winding assembly 14 securely within the casing 12. Or, if desired, the casing 12 may be eliminated, with the core-coil assembly 14 and insulating material 22 being disposed in a mold. After the insulating material 22 has cured, the molded core-coil assembly may be removed from the mold and operated dry or in a fluid filled enclosure.

The filler materials which may be used with the thermosetting resin to obtain crack-free solid insulation, may comprise at least one inert, finely divided, non-friable, inorganic filler selected from the group consisting of silica, silicates, alumina and hydrated alumina. Examples of such fillers include sand, porcelain, aluminum silicate, mica powders, magnesium silicate, glass, and aluminum oxide. Fillers having an average size of 40 mesh have given good results.

Examples of resinous polymeric epoxides, polyester resins and silicone resins, which may be used, are described in U.S. Patent 3,030,597 which issued Apr. 17, 1962 on an application by C. Piaia, Jr. et al., which is assigned to the same assignee as the present application.

The transformer 10, shown in FIG. 1, may be constructed by suspending the magnetic core and coil assembly 14 within the casing 12 in the desired relative position within the casing. Or, a bracket (not shown) may be attached to the top 24, which serves to hold and position the magnetic core and winding assembly 14. Then, a suitable liquid resin is introduced into the casing 12 to a predetermined level, with the casing 12 being in an inverted position from that shown in FIG. 1. Finely divided inorganic filler is introduced into the casing 12 until the level of the filler and liquid resin mixture covers the core and winding assembly 14 and reaches the desired level in the casing 12. The casing 12 may be vibrated or vacuum impregnated to insure that all voids in the core and winding assembly 14 are filled with resin and filler. The capsulated transformer 10 is then placed in an oven and heated to a predetermined temperature for a period of time to cure the insulating material 22 to a tough, hard, solid mass. A typical curing cycle for epoxy resin is three hours at a temperature of 135° C.

An alternate construction method is to first add a small amount of resin and filler to the casing before the magnetic core and winding assembly is introduced, which is then cured in an oven with a fast setting catalyst, such as diethylene triamine, to insure that the end of the casing is completely sealed. The magnetic core and winding assembly is then introduced, and the additional resin and filler added, as hereinbefore described.

The resin and filler is added to completely cover the magnetic core and winding assembly 14, with the electrical leads 30, 32, 34 and 36 being positioned to extend therefrom. The space 40 between the solid insulation 22 and the bottom section 26 is used to make electrical connections to the leads 30, 32, 34 and 36. Suitable terminals or terminal strips may be molded into the insulation 22 at the time of curing, if desired.

Figure 2:
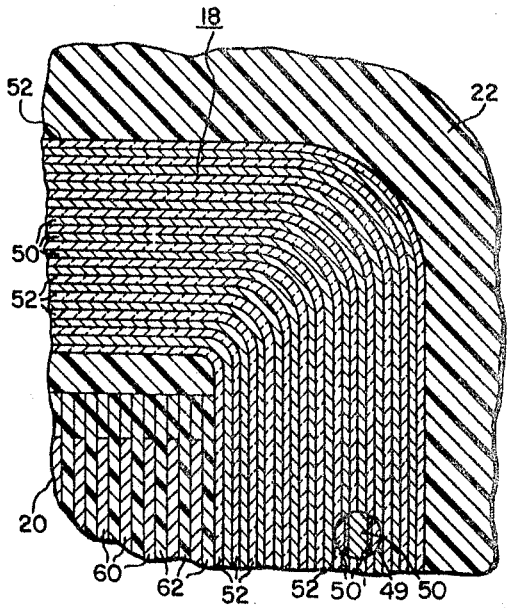
FIG. 2 is an enlarged fragmentary view of a portion of the transformer shown in FIG. 1.

FIG. 2 is an enlarged fragmentary view of the transformer shown in FIG. 1, specifically showing a portion of the upper right-hand corner of magnetic core 18 and the surrounding area. The individual laminations 50 of magnetic core 18 are separated and bonded together by glass insulation 52. Glass insulation 52 also coats the outer and inner laminations 50 of the magnetic core 18. The magnified portion 49 of FIG. 2 illustrates the metallic barrier metal 50' which may be applied to the laminations 50 to prevent iron oxide growth in the glass insulation 52, as hereinbefore described. Solid insulation 22 completely capsulates the core and windings, filling all openings and voids. The winding 20, shown in FIG. 2, illustrates conductors 60 being separated by electrical insulation 62. Conductor 60 is illustrated as being foil or strip, but may also be wire conductor.

Transformers constructed according to the teachings of this invention are practically unaffected by potting or capsulating stresses, unlike transformers constructed with organically bonded cores. To illustrate the remarkable difference and stability of glass bonded cores capsulated in a solid insulation, two groups of transformers were constructed, with the transformers in each group being similar in all respects except for the interlaminar adhesive used. The first group utilized an epoxy adhesive to bond the nested laminations together, and the second group used a glass insulation and adhesive similar to the specific composition listed in Table I. The magnetic cores had a window or opening which measured ⅞" x 2⁵⁄₁₆", legs which measured 2¼" x 1³⁄₁₆", and a weight of 4.17 pounds. The magnetic cores of both groups were assembled, using similar electrical coils, and tested for core loss and exciting volt-amperes at rated voltage (16 kg. induction) before capsulation. The core and winding assemblies were then potted or capsulated in an epoxy resin binder and crushed sandstone filler (12–40 mesh), and again tested for core loss and exciting volt-amperes. The results are tabulated in Table II below:

TABLE II

|  | Core Loss (Watts) | | Exciting Volt-Amperes | |
|---|---|---|---|---|
|  | Before Potting | After Potting | Before Potting | After Potting |
| Transformers With Organically Bonded Cores. | 6.22 | 7.18 | 34.8 | 43.44 |
|  | 6.54 | 7.36 | 33.88 | 46.08 |
|  | 6.24 | 7.14 | 34.08 | 42.00 |
|  | 6.28 | 7.28 | 32.64 | 39.60 |
|  | 6.24 | 7.34 | 41.76 | 48.96 |
| Average | 6.30 | 7.26 | 36.43 | 44.02 |
| Percent Change | +15.2 | | +20.8 | |
| Transformers With Glass Bonded Cores. | 5.98 | 6.22 | 31.92 | 31.92 |
|  | 7.04 | 7.28 | 41.04 | 40.80 |
|  | 6.62 | 7.02 | 24.24 | 24.48 |
|  | 7.64 | 7.68 | 33.60 | 34.08 |
|  | 9.22 | 9.22 | 37.92 | 37.92 |
|  | 5.82 | 5.82 | 31.68 | 30.48 |
|  | 6.36 | 6.58 | 37.44 | 37.68 |
|  | 6.58 | 6.88 | 27.36 | 27.12 |
|  | 7.82 | 7.94 | 35.04 | 35.04 |
| Average | 7.01 | 7.19 | 33.36 | 33.28 |
| Percent Change | +2.5 | | −0.5 | |

It will be observed that the average core loss of the transformers having the resin bonded cores was 6.3 watts before potting and 7.26 watts after potting, an increase of 15.2%. The average core loss of the glass bonded cores was 7.01 watts before potting and 7.19 watts after potting, an increase of only 2.5%. This illustrates that potting or capsulating glass bonded cores has very little effect upon the core loss of the cores, while potting organically bonded cores increases the core loss significantly.

The difference is even more remarkable when comparing the affect of potting on the exciting volt-amperes. The average exciting volt-amperes of the organically bonded cores was 36.43 volt-amperes before potting and 44.02 volt-amperes after potting, an increase of 20.8%. The average exciting volt-amperes of the glass bonded cores was 33.36 before potting, and 33.28 after potting, a decrease of 0.5%. The effect of potting on the exciting volt-amperes of glass bonded cores was nil, while the exciting volt-amperes of the organically bonded cores increased an average of 20.8%.

In addition to being substantially unaffected by potting stresses, transformers constructed according to the teachings of this invention produce other significant advantages. For example, transformers utilizing organically bonded cores are limited to an operating temperature of 250° C. if the core is braced, and to 150° C. if not. Otherwise, delamination of the core occurs. Transformers using glass bonded cores may be operated at temperatures of 500° C., or higher, without delaminating, or other deleterious effects. Therefore, in capsulated transformers, the operating temperature of the core will not be the limiting factor, but may be operated at the highest temperature that the capsulating insulation will successfully withstand.

Further, any increase in the cost of the magnetic strip due to the application of the glass, is offset by the elimination of the vacuum impregnation of the cores with organic bonding material, the elimination of the bake or curing of the organic binder, and the elimination of the strain relieving heat treatment of the cores after the cutting operation.

Another benefit derived when constructing transformers according to the teachings of this invention is the substantial reduction in their noise level. The glass is selected to have a lower coefficient of expansion than the metal strip. When the magnetic core cools from its annealing temperature, the strip contracts more than the glass coating, placing the metal strip under a slight tension and placing the glass under compression. Placing the strip under a slight tension actually results in an improvement in exciting volt-amperes and core losses. Also, placing the strip under tension reduces magnetostriction, and the noise due to magnetostriction is reduced accordingly.

Figure 3:
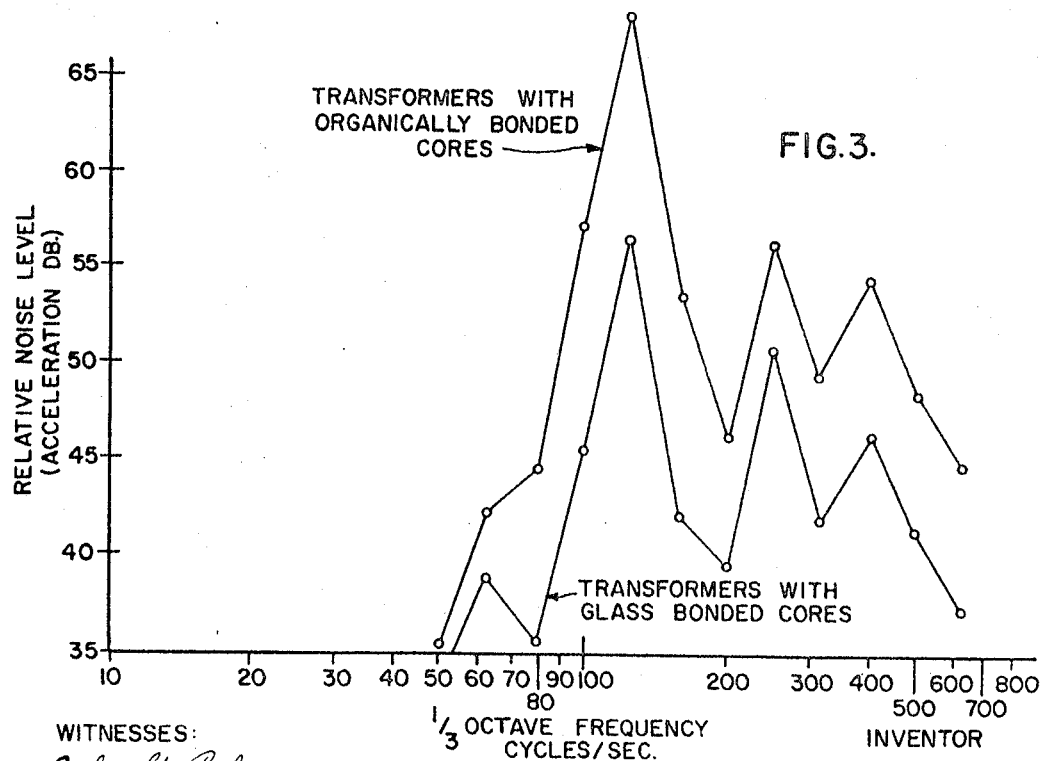
FIG. 3 is a graph comparing the sound level of a transformer constructed according to the teachings of this invention with a transformer constructed according to prior art teachings.

Structure borne noise measurements were made on the two groups of transformers, hereinbefore referred to when discussing the effect of capsulation on core losses and exciting volt-amperes. The average for each group was plotted and is shown in FIG. 3. FIG. 3 compares the relative noise level of transformers having organically bonded cores with the relative noise level of transformers having glass bonded cores. It will be observed that the transformers having the glass bonded cores are significantly quieter than the transformers having organically bonded cores, as much as 12 db at the second harmonic noise peak.

While the drawings illustrate the transformer 10 as being single phase, it will be obvious that the teachings of the invention apply equally to polyphase transformers, or any type of capsulated inductive apparatus.

Thus, there has been shown and described a new and improved capsulated structure for inductive apparatus, that is substantially unaffected by the strains introduced into the core and winding assembly by capsulation. The core loss and exciting volt-amperes of a transformer constructed according to the teachings of this invention are substantially the same after potting or capsulation as before. Further, the transformer may be constructed with fewer manufacturing steps, will operate at a higher temperature level, and produces a lower sound level, than capsulated transformers of the prior art.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. Electrical inductive apparatus comprising magnetic core means, said magnetic core means including a plurality of metallic laminations separated by an inorganic vitreous material which extends between adjacent laminations to electrically insulate and bond the laminations together to form a coherent solid structure, said inorganic vitreous material having a lower coefficient of thermal expansion than said metallic laminations, which, after annealing and cooling said magnetic core means, places said metallic laminations in tension and said inorganic vitreous material in compression, electrical winding means, said electrical winding means being disposed in inductive relation with said magnetic core means to form a core-winding assembly, solid thermosetting electrical insulating means, said solid electrical insulating means capsulating said core-winding assembly.

2. The electrical inductive apparatus of claim 1 wherein said metallic laminations have a barrier layer of metal between said metallic laminations and said inorganic vitreous material to maintain said inorganic vitreous material free of contaminants.

3. The electrical inductive apparatus of claim 1 wherein said inorganic vitreous material has a softening temperature which is substantially the same as the annealing temperature of said metallic laminations.

4. The electrical inductive apparatus of claim 1 wherein said inorganic vitreous material is glass.

5. The electrical inductive apparatus of claim 1 wherein said solid thermosetting electrical insulating means includes inert filler means.

6. The electrical inductive apparatus of claim 1 wherein said magnetic core means is of the wound type, with said plurality of metallic laminations being in nested relation.

References Cited

UNITED STATES PATENTS

| | | | |
|---|---|---|---|
| 1,877,569 | 9/1932 | Falkenthal | 336—219 |
| 2,561,462 | 7/1951 | Compton | 336—219 X |
| 3,030,597 | 4/1962 | Piaia | 336—96 X |
| 3,284,683 | 11/1966 | Rieth | 317—261 X |

FOREIGN PATENTS 573,780  12/1945  Great Britain.

OTHER REFERENCES

Westinghouse Brochure, dated Aug. 24, 1961, titled: New From Westinghouse—Dry Type General Purpose Transformers With Rezildur, copy 336–96.

LEWIS H. MYERS, Primary Examiner

E. GOLDBERG, Assistant Examiner

U.S. Cl. X.R.

336—96, 219, 234